US009244588B2

(12) United States Patent
Begosa et al.

(10) Patent No.: US 9,244,588 B2
(45) Date of Patent: Jan. 26, 2016

(54) FACILITATING GROUP ACTIVITIES IN A VIRTUAL ENVIRONMENT

(71) Applicant: Disney Enterprises, Inc., Burbank, CA (US)

(72) Inventors: Howard Begosa, Los Angeles, CA (US); Jiro Ietaka, Los Angeles, CA (US); Matt Lisuch, Long Beach, CA (US); Gary Todd Masilko, Sierra Madre, CA (US); Ryan James McDonald, Pasadena, CA (US); Robert Quinn, Santa Monica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 287 days.

(21) Appl. No.: 13/843,701

(22) Filed: Mar. 15, 2013

(65) Prior Publication Data

US 2014/0282112 A1 Sep. 18, 2014

(51) Int. Cl.
*G06F 3/048* (2013.01)
*G06F 3/0481* (2013.01)
*G06Q 10/10* (2012.01)

(52) U.S. Cl.
CPC .......... *G06F 3/04815* (2013.01); *G06Q 10/101* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 6,559,863 | B1* | 5/2003 | Megiddo | ............ | H04L 12/1827 348/14.08 |
| 6,772,195 | B1* | 8/2004 | Hatlelid | ............ | G06F 3/04815 345/419 |
| 7,124,372 | B2* | 10/2006 | Brin | ............ | H04L 12/1822 715/751 |
| 7,386,799 | B1* | 6/2008 | Clanton | ............ | A63F 13/12 715/753 |
| 7,840,903 | B1* | 11/2010 | Amidon | ............ | G06F 3/04815 715/733 |
| 8,082,297 | B2* | 12/2011 | Syvain | ............ | A63F 13/12 700/94 |
| 8,533,596 | B2* | 9/2013 | Boss | ............ | G06Q 10/10 709/204 |
| 2007/0207860 | A1* | 9/2007 | Yamauchi et al. | ............ | 463/42 |
| 2009/0089685 | A1* | 4/2009 | Mordecai | ............ | G06F 3/011 715/757 |
| 2009/0259948 | A1* | 10/2009 | Hamilton, II | ............ | A63F 13/12 715/757 |
| 2010/0081508 | A1* | 4/2010 | Bhogal | ............ | A63F 13/12 463/40 |
| 2010/0125633 | A1* | 5/2010 | Chatani | ............ | A63F 13/12 709/205 |
| 2011/0219339 | A1* | 9/2011 | Densham | ............ | 715/849 |
| 2012/0131478 | A1* | 5/2012 | Maor | ............ | G06T 11/60 715/757 |
| 2013/0132837 | A1* | 5/2013 | Mead et al. | ............ | 715/716 |

* cited by examiner

*Primary Examiner* — Dino Kujundzic
(74) *Attorney, Agent, or Firm* — Patterson + Sheridan LLP

(57) ABSTRACT

Techniques are disclosed to facilitate group activities in a virtual environment. An indication is conveyed of a region surrounding a first avatar as being a group activity region, upon detecting that the first avatar is leading a first group activity in the virtual environment. The region is defined by proximity to the first avatar. A second avatar is allowed to participate in the first group activity with the first avatar in the region, only when the second avatar is within the region surrounding the first avatar in the virtual environment.

23 Claims, 11 Drawing Sheets

FACILITATING GROUP ACTIVITIES IN A VIRTUAL ENVIRONMENT

BACKGROUND

A virtual world is a simulated environment in which users may interact with virtual objects and locations of the virtual world. Each user may control a respective avatar through which the user may interact with other users' avatars in the virtual world. An avatar generally provides a graphical representation of an individual within the virtual world environment. Avatars are usually presented to other users as two or three-dimensional graphical representations that resembles a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available and where events continue to occur regardless of the presence of a given avatar. Thus, unlike more conventional online games or multi-user environments, the virtual world continues to exist and plots and events continue to unfold as users enter (and exit) the virtual world. Virtual environments are presented as images on a display screen and some virtual environment may allow users to record events that occur within the virtual environment.

SUMMARY

Embodiments presented in this disclosure provide a computer-implemented method, a computer-readable medium, and a system to perform an operation to facilitate group activities in a virtual environment. The operation includes conveying an indication of a region surrounding a first avatar as being a group activity region upon detecting that the first avatar is leading a first group activity in the virtual environment. The region is defined by proximity to the first avatar. The operation also includes allowing a second avatar to participate in the first group activity with the first avatar in the region, only when the second avatar is within the region surrounding the first avatar in the virtual environment.

BRIEF DESCRIPTION OF THE DRAWINGS

So that the manner in which the above recited features, advantages and objects of embodiments presented in this disclosure are attained and can be understood in detail, a more particular description of the embodiments, briefly summarized above, may be had by reference to the embodiments thereof which are illustrated in the appended drawings.

It is to be noted, however, that the appended drawings illustrate only typical embodiments disclosed herein and are therefore not to be considered limiting of its scope, for the disclosure may admit to other equally effective embodiments.

DETAILED DESCRIPTION

Figure 1:
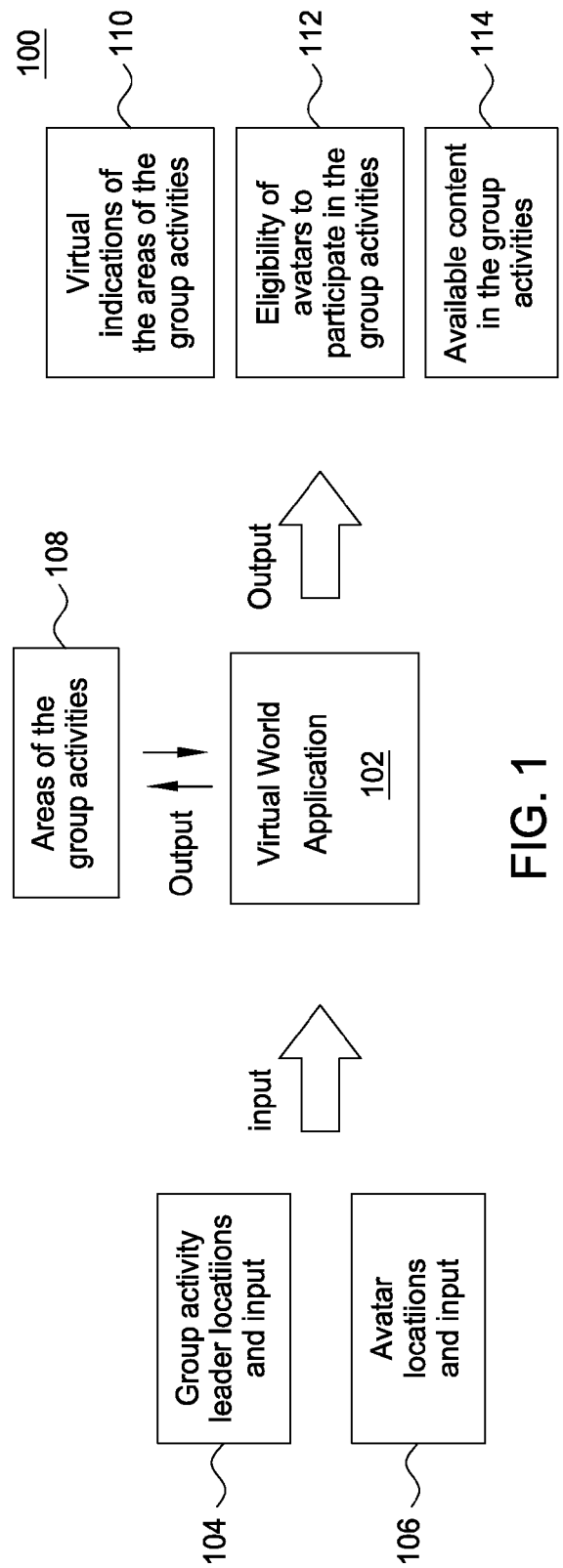
FIG. 1 is a data flow diagram illustrating an application configured to facilitate group activities in a virtual environment, according to one embodiment presented in this disclosure.

Facilitating group activities in a virtual environment may pose many challenges. In some embodiments, a user interface, such as a lobby system, may be provided to allow players to browse available group activities and select a group activity to join. However, such a user interface may often be too cumbersome for players or too sophisticated for younger audiences to use on a regular basis.

Embodiments presented in this disclosure provide techniques to facilitate group activities in a virtual environment. In one embodiment, a first avatar commences a group activity in the virtual environment. The group activity may have an associated region in the virtual environment, as defined by one or more rules pertaining to the group activity. The region may be of a predefined dimension, such as a one-dimensional region, also referred to as a line, a two-dimensional region, also referred to as an area, or a three-dimensional region, also referred to as a volume. In one embodiment, for example, a group musical performance, also referred to herein as a jam session, may have an associated area that is a circle of a specified radius around the first avatar, where the area is disposed on a substantially horizontal plane in the virtual world. In some embodiments, the area may additionally have an associated height, in which case the space defined by the area and height may be referred to as a volume associated with the group activity. Further, in some embodiments, the circle is disposed such that the first avatar is at the center of the circle. The area may be conveyed to avatars in the virtual environment by visual cues such as a halo effect. Avatars outside of the area are not eligible to participate in the group activity. Once inside of the area, avatars may become eligible to participate in the group activity.

In a particular embodiment, avatars outside of the area associated with a jam session are not allowed to hear the jam session. Once inside the area associated with the jam session, the avatars are allowed to hear the jam session and are further allowed to participate in performing the jam session. Participation in a group activity may affect the available content in the group activity. In a particular embodiment, for example, different tracks of a jam session and pertaining to different instruments are played back only if there are avatars currently playing the tracks and instruments as part of the jam session. If no avatar is currently playing a given track or instrument, then the given track or instrument is not played back as part of the jam session.

In some embodiments, eligibility to participate in a given group activity is also subject to properties of the given group activity, such as a maximum number of players supported by the given group activity. In one embodiment, users of avatars within the area are requested to confirm that they wish to join the group activity. Once confirmed, the avatars may participate in the group activity. If an avatar participating in the group activity leaves the area, then the user of the avatar are requested to confirm that they wish to leave the group activity. In an alternative embodiment, avatars join and leave group activities without requiring any confirmation. In a still alternative embodiment, whether confirmation is needed for an avatar to join or to leave group activities is set by an administrative user of the virtual environment or by an end-user of the avatar.

In one embodiment, the area of the group activity may vary depending on how many participants there are in the group activity. Alternatively, the area of the group activity may vary depending on how many avatars there are in the group activity and regardless of how many of the avatars are participants. In the example of a jam session, avatars participating in the jam session may be distinguished from avatars not participating in the jam session in that the former is output in the virtual world as playing musical instruments, while the latter is output in the virtual world as not playing any musical instrument. In some embodiments, areas of different group activities are prevented from overlapping with one another in the virtual environment.

The techniques disclosed herein may allow users to ascertain available group activities and participants and join or leave the available group activities more conveniently at least in some cases, at least relative to alternative approaches such as those involving a lobby system listing all available group activities or participants. In particular, in providing users with a virtual world application based on the techniques disclosed herein, the users may ascertain available group activities and participants and join or leave the available group activities without having to use any such lobby system. User satisfaction with the virtual environment may thus be improved.

FIG. 1 is a data flow diagram 100 illustrating an application configured to facilitate group activities in a virtual environment, according to one embodiment presented in this disclosure. As shown, the application is a virtual world application 102 configured to determine areas 108 of group activities based on group activity leader locations and input 104 and avatar locations and input 106. As described above, the areas 108 of group activities may be determined based further on rules associated with the group activities. In one embodiment, the areas 108 of the group activities are circular areas surrounding the locations of avatars leading the group activities. In some embodiments, a group activity area may be defined at least in part by proximity to an avatar location of the group activity leader. In other embodiments, the group activity is not necessarily defined based on proximity to the avatar location of the group activity leader.

In one embodiment, the virtual world application 102 is further configured to generate visual indications 110 of the areas of the group activities, such as a halo effect in the virtual environment. The virtual world application 102 is further configured to determine eligibility 112 of avatars to participate in the group activities, such as based on whether the avatars are within the determined areas or whether a maximum number of participants in a group activity has been reached. The virtual world application 102 is further configured to determine available content 114 in the group activities, such as which tracks or instruments of a jam session are played back to users of avatars performing the jam session.

Figure 2:
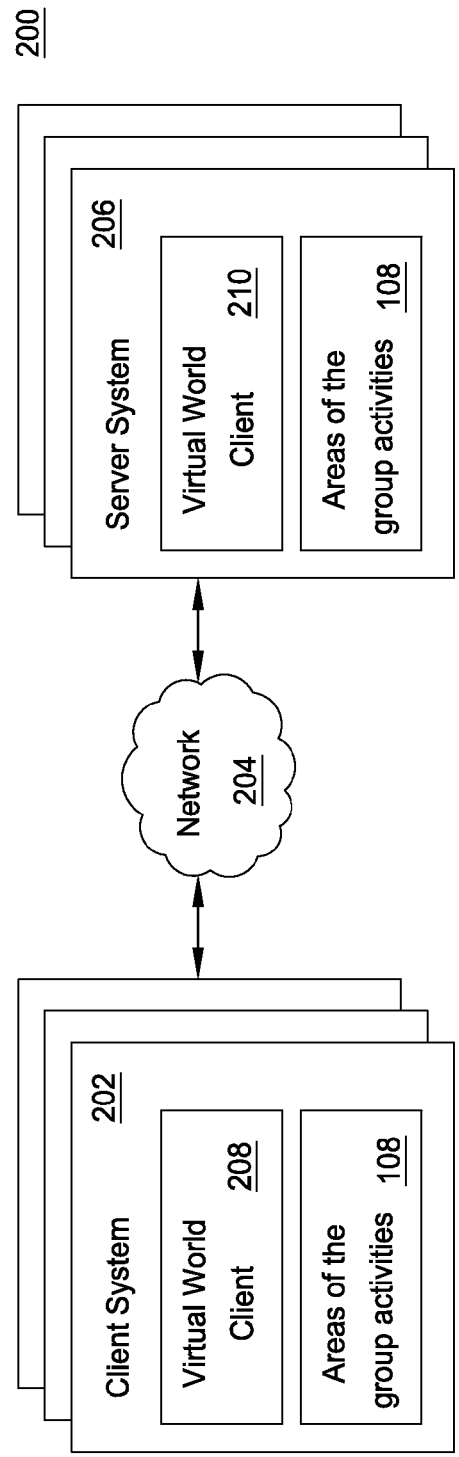
FIG. 2 is a block diagram illustrating a networked system configured to facilitate group activities in the virtual environment, according to one embodiment presented in this disclosure.

FIG. 2 is a block diagram illustrating a networked system 200 configured to facilitate group activities in a virtual environment, according to one embodiment presented in this disclosure. As shown, the system 200 includes a plurality of client systems 202 connected to a plurality of server systems 206 via a network 204. Depending on the embodiment, the virtual world application 102 may be one or more of a virtual world client 208 or a virtual world server 210.

In one embodiment, each of the client systems 202 is configured to operate the virtual world client 208. Examples of the client systems 202 include, without limitation, console gaming systems (e.g., the Microsoft Xbox 360®, the Sony Playstation® 3, etc.), handheld gaming systems (e.g., the Nintendo 3DS™ and DST™, the Sony PSP®, etc.), personal computer gaming systems and so on. The server systems 206 are configured to operate the virtual world server 210. Generally, the virtual world server 210 is configured to receive connections from users (e.g., via the virtual world clients 208) and to manage a virtual environment and interactions between the users within the virtual environment. In one embodiment, the virtual environment is a virtual world. The virtual world client 208 or the virtual world server 210 may output visual indications 110 of the areas of group activities in the virtual environment. Accordingly, group activities in a virtual environment may be facilitated at least in some cases.

Figure 3:
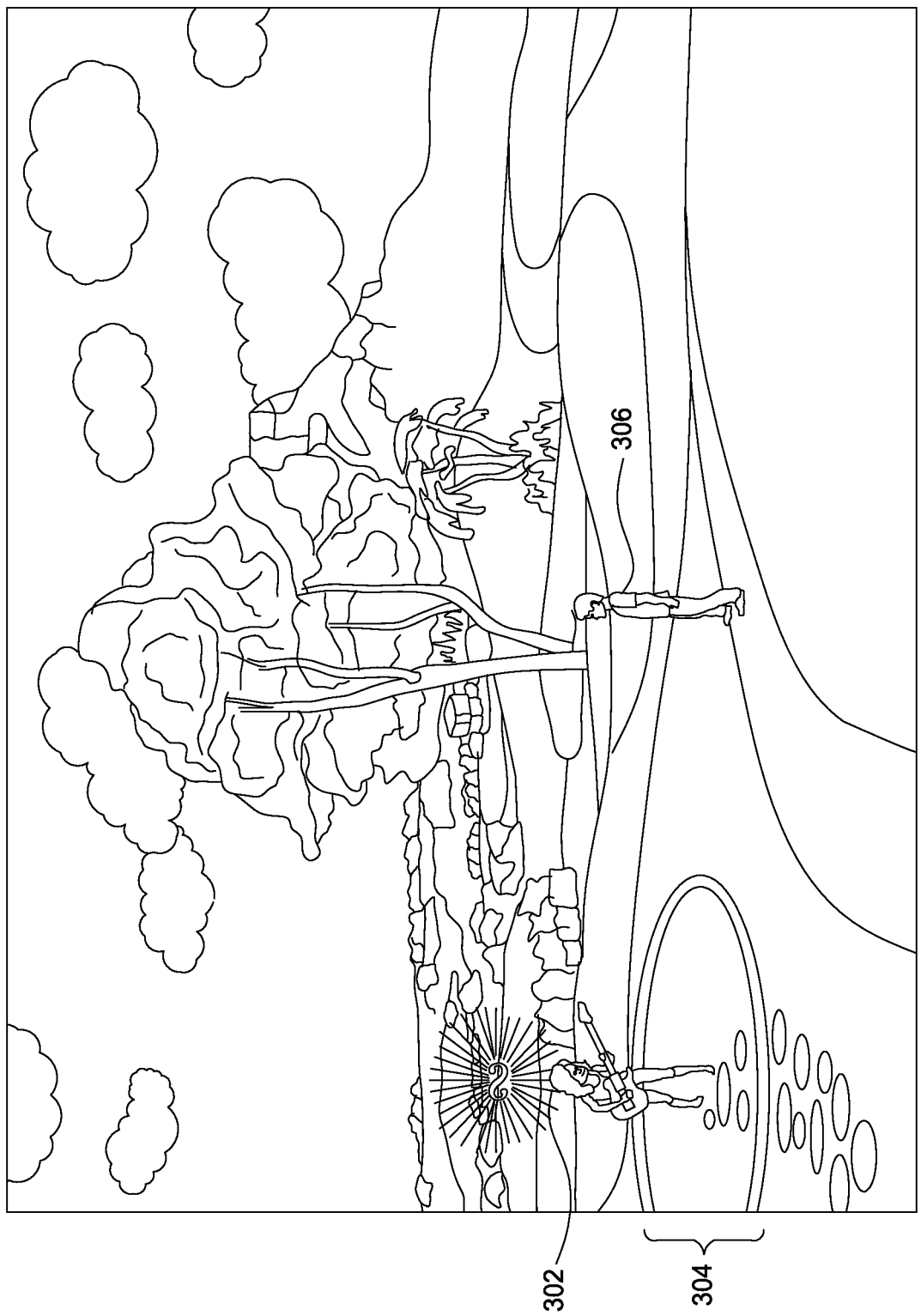
FIG. 3 is a depiction of a virtual environment in which a group activity is occurring, according to one embodiment presented in this disclosure.

FIG. 3 is a depiction 300 of a virtual environment in which a group activity is occurring, according to one embodiment presented in this disclosure. Continuing the above example of a jam session, assume that a first avatar 302 has commenced a jam session in the virtual environment and having an associated area 304. As shown, the area 304 is a circular area having the location of the first avatar 302 as its midpoint. A visual indication of the area 304 is provided in the form of a halo effect along the perimeter of the circular area in the virtual environment. The visual indication conveys to other users, such as a user of an avatar 306, that the circular area is an area of a group activity led by the first avatar 302 and in which only the first avatar 302 is currently participating. Areas of different group activities may be distinguished by any attribute of the halo effect, such as color, opacity, height, width, etc.

As described above, in one embodiment, users do not hear a given jam session when their avatars are not within the area of the jam session. It is when the avatars enter the area of the jam session that the jam session then becomes audible to the users. Playback of the jam session for a given user may be altered based on at least one of a location and an orientation of the user within the area of the jam session. For example, in some embodiments, the audio of the jam session pans for the user as the user moves through the area. For instance, the audio may play from a left channel speaker of the user if the avatar of the user is on the left side of the area, the center channel speaker of the user if the avatar is in the center of the area, and the right channel speaker of the user if the avatar is on the right side of the area, respectively. Additionally or alternatively, the playback volume of the jam session may increase as the user moves toward a designated, central location of the area, such as the center of the area.

At least in some embodiments, playback alternation of the jam session as described above applies only to non-participant avatars within the area of the jam session. In such embodiments, playback of the jam session for participant avatars within the area may be as if the participant avatars were at the designated, central location of the area. For instance, the jam session may be played back at a maximum volume associated with the central location and without any audio panning—regardless of where the participant avatars move within the area.

In one embodiment, any ambient music associated with the virtual environment is disabled when a music jam is played back. Additionally or alternatively, any sound effects associated with the virtual environment are reduced in volume by a predefined extent. At least in some embodiments, the jam session is output via the same audio channels for users, regardless of whether their avatars are participants or non-participants in the jam session—and not via any audio channels for the sound effects associated with the virtual environment.

Figure 4:
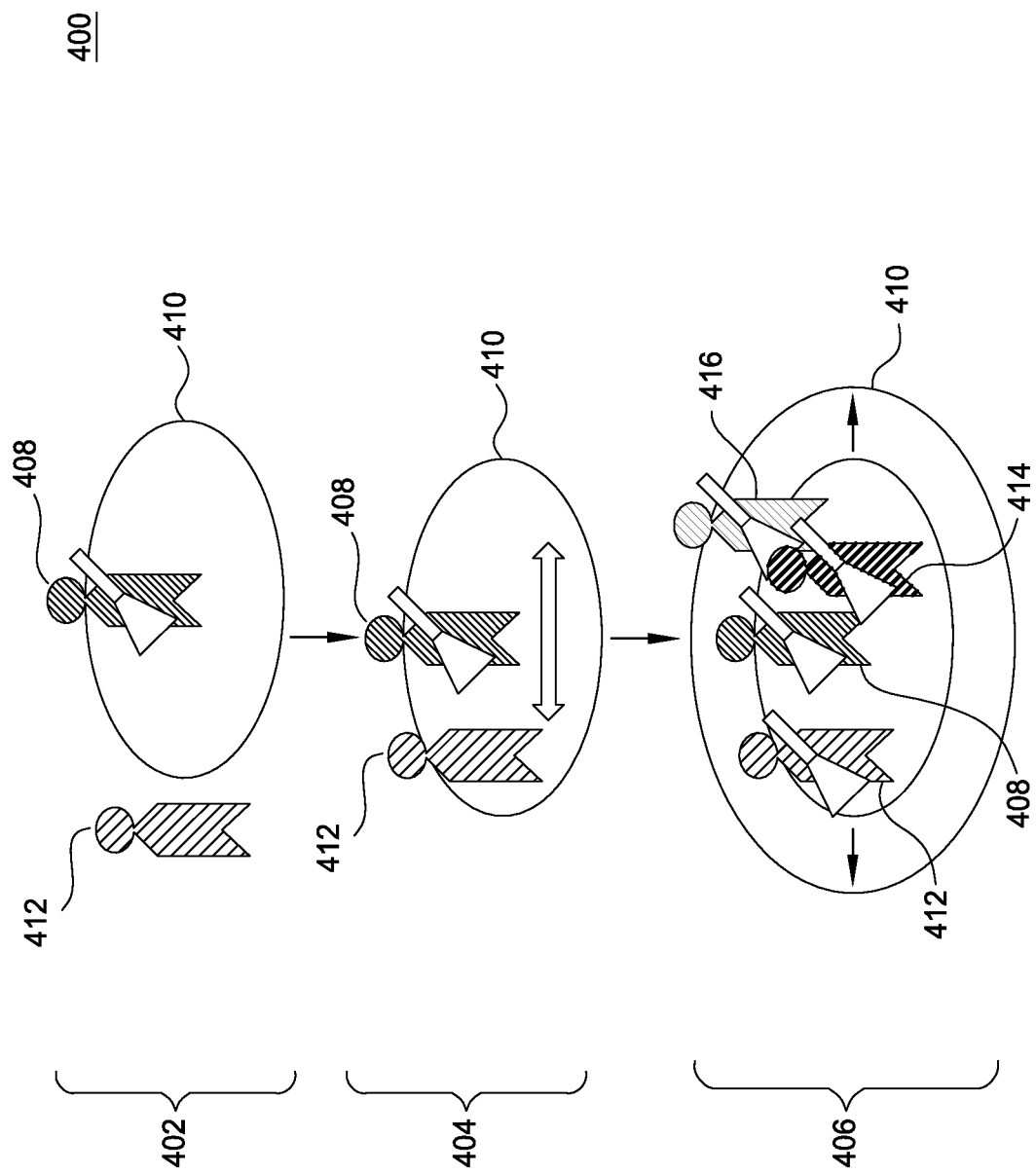
FIG. 4 is a diagram showing a progression of an area of the group activity over time, according to one embodiment presented in this disclosure.

FIG. 4 is a diagram 400 showing a progression of an area of a group activity over time, according to one embodiment presented in this disclosure. The progression includes a first instance 402, a second instance 404, and a third instance 406, arranged sequentially in time. As shown in the first instance 402, a first avatar 408 is leading the group activity of a jam session and having the area indicated by the halo effect 410. Further, a second avatar 412 is outside of the area. Accordingly, the jam session is inaudible to the user of the second avatar 412.

Assume that the second avatar 412 enters the area, as shown in the second instance 404, at which point the jam session becomes audible to the user of the second avatar 412. Further, as described above, the closer the second avatar 412 moves to the center of the area, the higher the playback volume of the jam session for the user of the second avatar 412. Further, as the second avatar 412 moves from left to right within the area of the jam session, the playback of the jam session for the user of the second avatar 412 pans from the left channel to the right channel. Assume that a third avatar 414 and a fourth avatar 416 also join the group activity, as shown in the third instance 406. As a result, the area of the jam session increases, as indicated by the halo effect 410 in the third instance 406. So doing expands the area in order to accommodate additional players to join the jam session.

As described above, in one embodiment, the area of the jam session may vary depending on how many avatar participants are within the area of the jam session. In a particular embodiment, halo effects for jam sessions having one to three avatar participants are one-third of the display resolution in width and one-fourth of the display resolution in height, also referred to as a starting size. Halo effects for jam sessions having four to seven avatar participants are larger than the starting size by fifty percent in terms of both width and height. Halo effects for jam sessions having eight or more avatar participants are twice as large as the starting size in terms of both width and height.

As described above, areas of jam session may be expanded in a manner that does not overlap with an area of any other group activity in the virtual environment. Further, users leaving a jam session may cause the area of the jam session to shrink to an appropriate size. The starting size and increased sizes of the area of a particular group activity may be tailored to suit the needs of an individual case.

Figure 5:
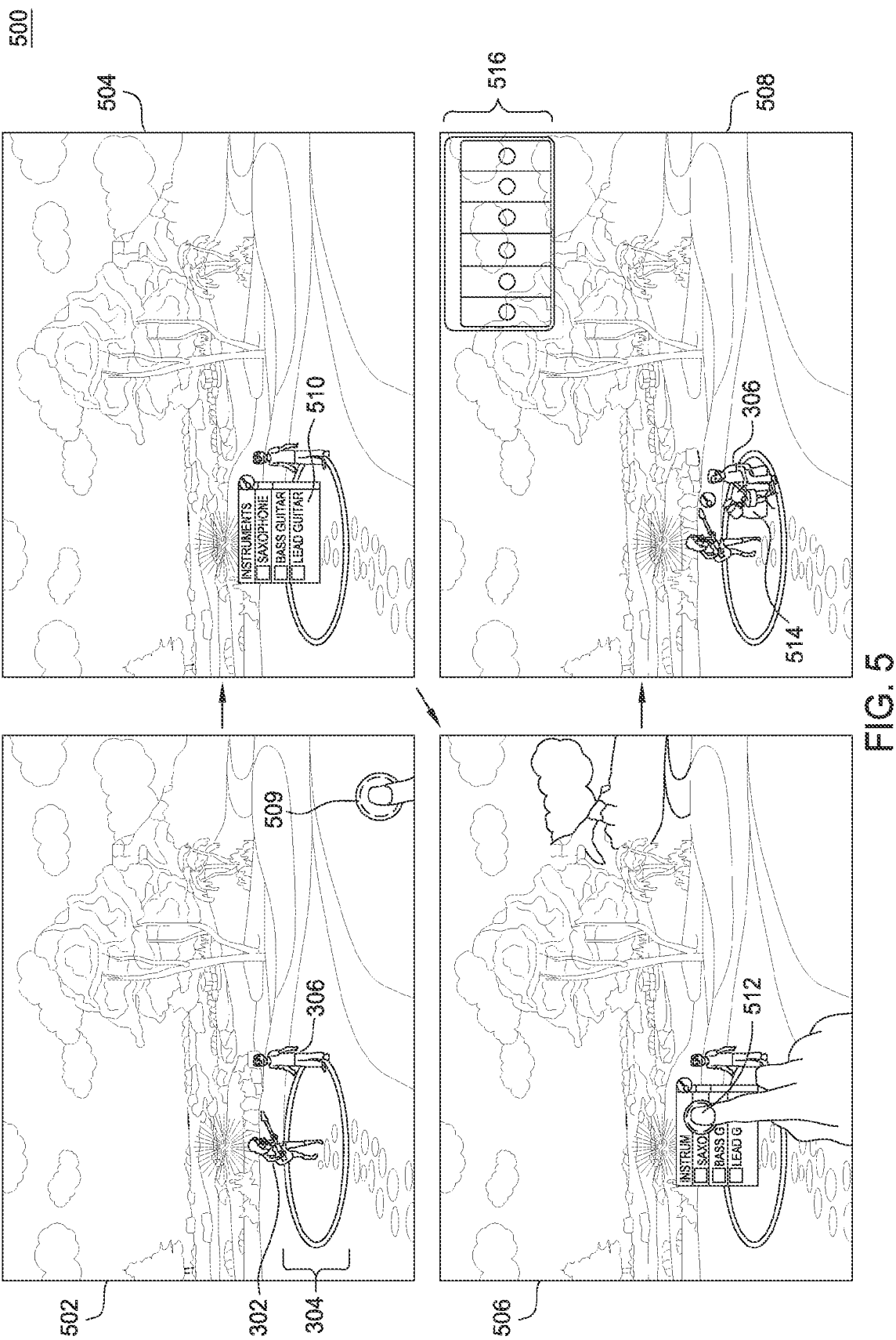
FIG. 5 is a diagram depicting a sequence of joining the group activity in the virtual environment, according to one embodiment presented in this disclosure.

FIG. 5 is a diagram 500 depicting a sequence of joining a group activity in a virtual environment, according to one embodiment presented in this disclosure. The sequence includes a first instance 502, a second instance 504, a third instance 506, and a fourth instance 508, arranged sequentially in time. As shown in the first instance 502, when the second avatar 306 enters the area of the jam session led by the first avatar 302, where the area is indicated by the halo effect 304, the user of the second avatar 306 may activate a contextual button 509 to confirm a desire to join the jam session as a participant. In one embodiment, the contextual button 509 is not visible to the user of the second avatar 306 when the second avatar 306 is not within an area of any group activity in the virtual environment.

As shown in the second instance 504, the user of the second avatar 306 is then presented with a list of available instruments 510 of the jam session. As shown in the third instance 506, the user of the second avatar 306 then selects a desired instrument 512. As shown in the fourth instance 508, the second avatar 306 is then shown performing the desired instrument 514 in the jam session in the virtual environment. In some embodiments, a contextual menu 516 may then be output for display to the user of the second avatar 306, to allow the user to change instruments, cease participation in the jam session, perform a predefined solo routine, toggle playback of riffs, etc.

In one embodiment, the song performed during the jam session features multiple instruments. In some embodiments, the song includes multiple distinct tracks for each instrument. Successive users selecting the same instrument may be assigned a successively next track for the instrument, until the tracks for the instrument are exhausted, at which point the first track for the instrument is once again assigned. In some embodiments, if multiple avatars are playing the same track for the same instrument, then an effect is added to playback of the track. For example, a reverb effect, an echo effect, a chorus effect, or some combination thereof may be added. Further, in one embodiment, the intensity of the effect may be increased with each additional avatar that is playing the same track for the same instrument, up to a predefined maximum intensity. The particular effects added and the predefined maximum intensity may be tailored to suit the needs of an individual case.

Figure 6:
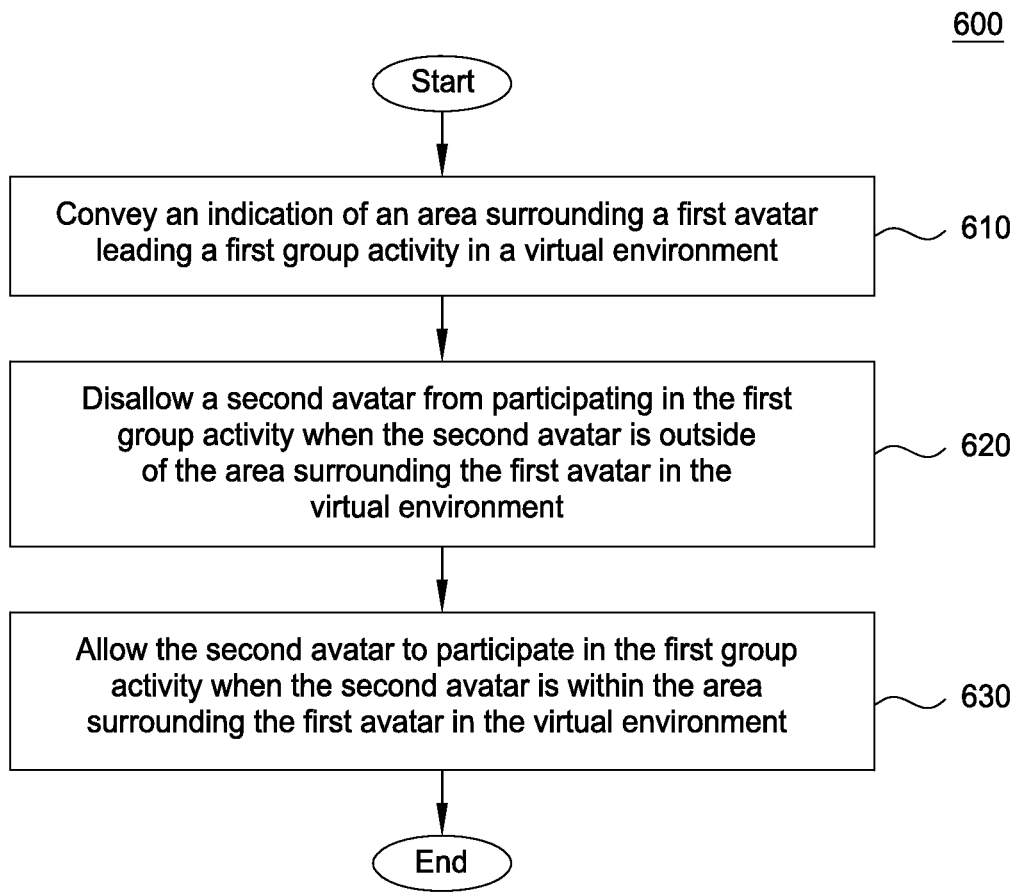
FIG. 6 is a flowchart depicting a method to facilitate group activities in the virtual environment, according to one embodiment presented in this disclosure.

FIG. 6 is a flowchart depicting a method 600 to facilitate group activities in a virtual environment, according to one embodiment presented in this disclosure. As shown, the method 600 begins at step 610, where the virtual world application 102 conveys an indication of an area surrounding a first avatar leading a first group activity in the virtual environment. At step 620, the virtual world application 102 disallows a second avatar from participating in the first group activity when the second avatar is outside of the area surrounding the first avatar in the virtual environment. At step 630, the virtual world application 102 allows the second avatar to participate in the first group activity when the second avatar is within the area surrounding the first avatar in the virtual environment. After the step 630, the method 600 terminates.

Figure 7:
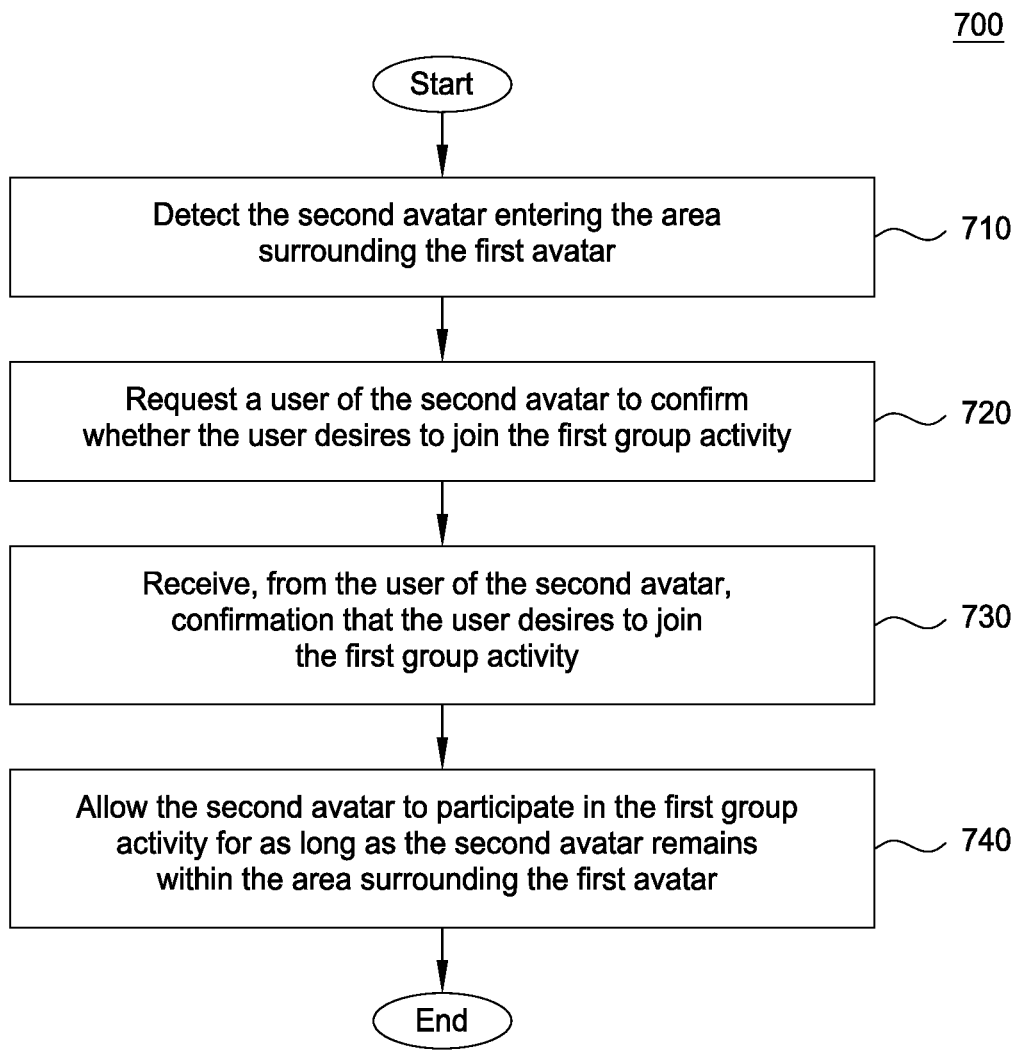
FIG. 7 is a flowchart depicting a method for an avatar to join the group activity in the virtual environment, according to one embodiment presented in this disclosure.

FIG. 7 is a flowchart depicting a method 700 for the second avatar to join the first group activity in the virtual environment, according to one embodiment presented in this disclosure. As shown, the method 700 begins at step 710, where the virtual world application 102 detects the second avatar entering the area surrounding the first avatar. At step 720, the virtual world application 102 requests the user of the second avatar to confirm whether the user desires to join the first group activity. At step 730, the virtual world application 102 receives, from the user of the second avatar, confirmation that the user desires to join the first group activity. At step 740, the virtual world application 102 then allows the second avatar to participate in the first group activity for as long as the second avatar remains within the area surrounding the first avatar in the virtual environment. After the step 740, the method 700 terminates.

Figure 8:
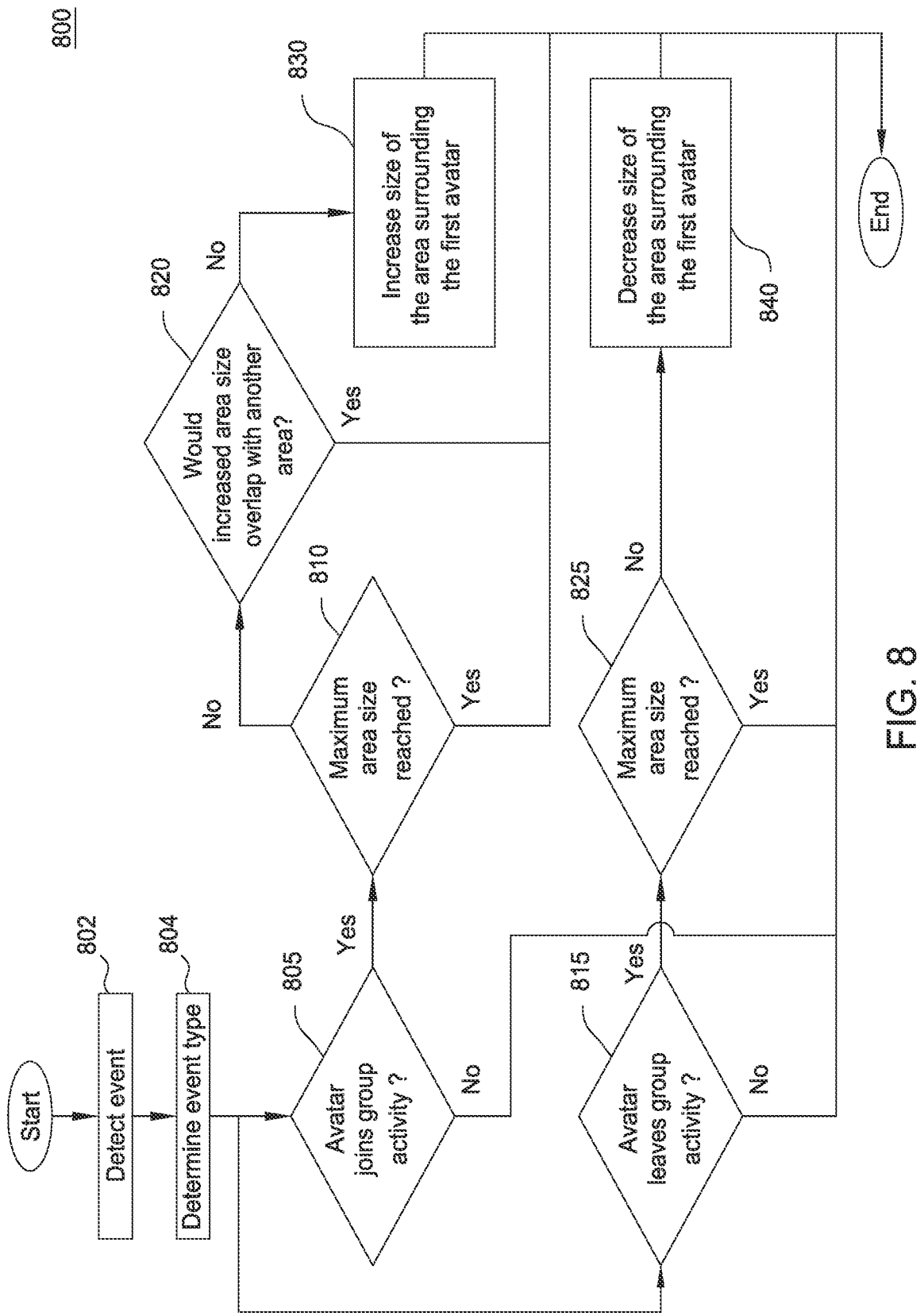
FIG. 8 is an event-driven flowchart depicting a method of adjusting the area of the group activity in the virtual environment, according to one embodiment presented in this disclosure.

FIG. 8 is an event-driven flowchart depicting a method 800 of adjusting an area of the first group activity in the virtual environment, according to one embodiment presented in this disclosure. As shown, the method 800 begins at step 802, wherein the virtual world application 102 detects an occurrence by an event. Depending on the embodiment, the virtual world application 102 may determine an event occurred based on predefined polling or interrupt techniques. For instance, the virtual world application 102 may periodically poll for events or receive an indication whenever an event occurs.

At step 804, the virtual world application 102 determines a type of the detected event. If the event type indicates that an avatar has just joined the group activity (step 805, then the virtual world application 102 determines whether a predefined maximum area size has been reached (step 810). If not, the virtual world application 102 determines whether increasing the size of the area would cause an overlap with an area of another group activity in the virtual environment (step 820). If not, then the virtual world application 102 increases the size of the area surrounding the first avatar in the virtual environment (step 830).

On the other hand, if the event type indicates that an avatar has just left the group activity (step 815), then the virtual world application 102 determines whether a predefined minimum area size has been reached (step 825). If not, then the virtual world application 102 decreases the size of the area surrounding the first avatar in the virtual environment (step 840). After the steps 830 or 840, and in the remaining instances, the method 800 terminates.

Figure 9:
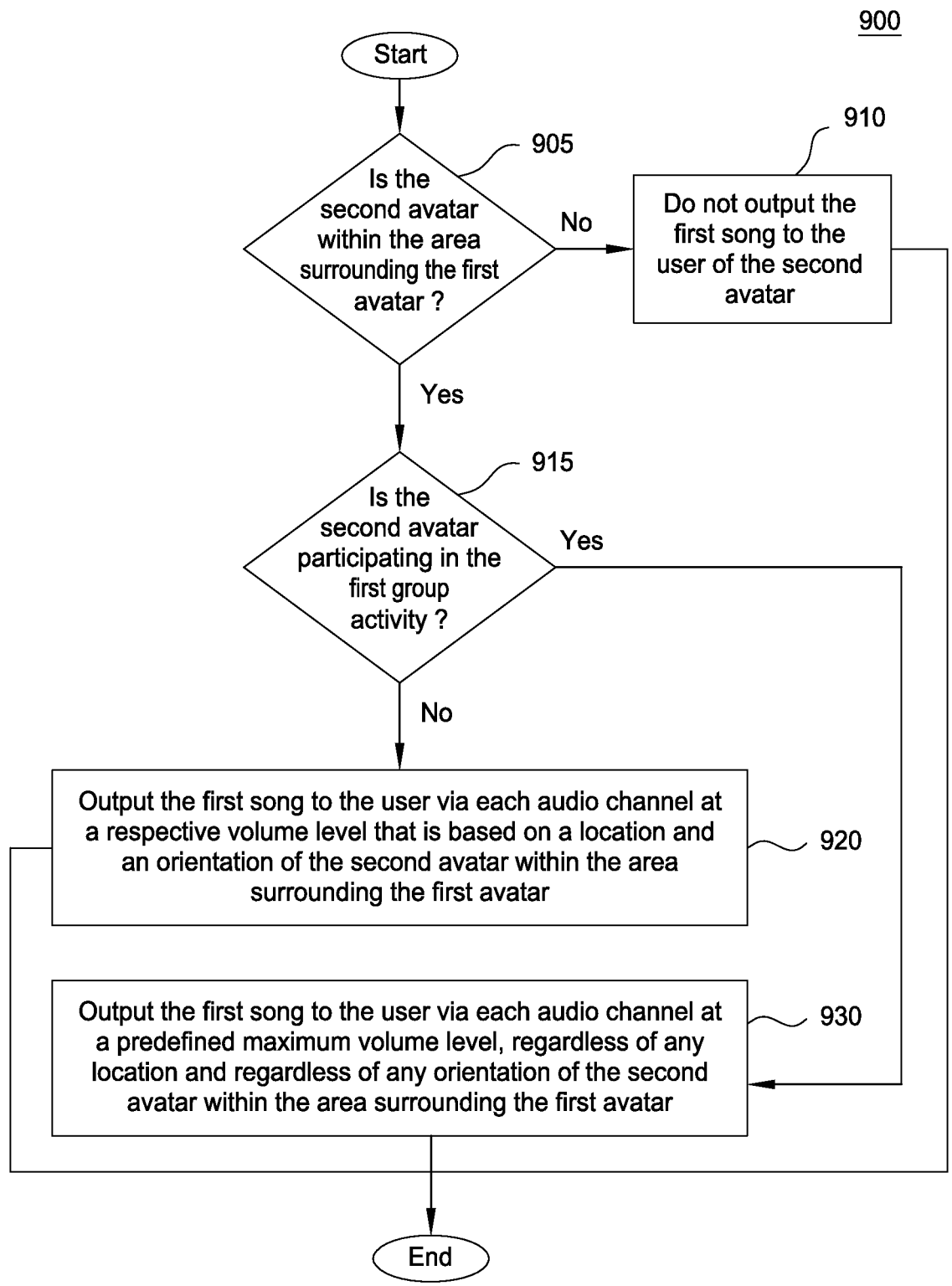
FIG. 9 is a flowchart depicting a method for adjusting playback of a first song performed as part of the group activity in the virtual environment, according to one embodiment presented in this disclosure.

FIG. 9 is a flowchart depicting a method 900 for adjusting playback of a first song performed as part of a group activity in the virtual environment, according to one embodiment presented in this disclosure. As shown, the method 900 begins at step 905, where the virtual world application 102 determines whether the second avatar is within the area surrounding the first avatar. If not, the virtual world application 102 does not output the first song to the user of the second avatar (step 910). Otherwise, the virtual world application 102 determines whether the second avatar is currently participating in the first group activity (step 915). If not, the method 900 proceeds to step 920, where the virtual world application 920 outputs the first song to the user via each audio channel at a respective volume level that is based on a location and an orientation of the second avatar within the area surrounding the first avatar in the virtual environment. Otherwise, the method 900 proceeds to step 930, where the virtual world application 920 outputs the first song to the user via each audio channel at a predefined maximum volume level, regardless of any location and regardless of any orientation of the second avatar within the area surrounding the first avatar in the virtual environment. After the steps 910, 920 or 930, the method 900 terminates.

Figure 10:
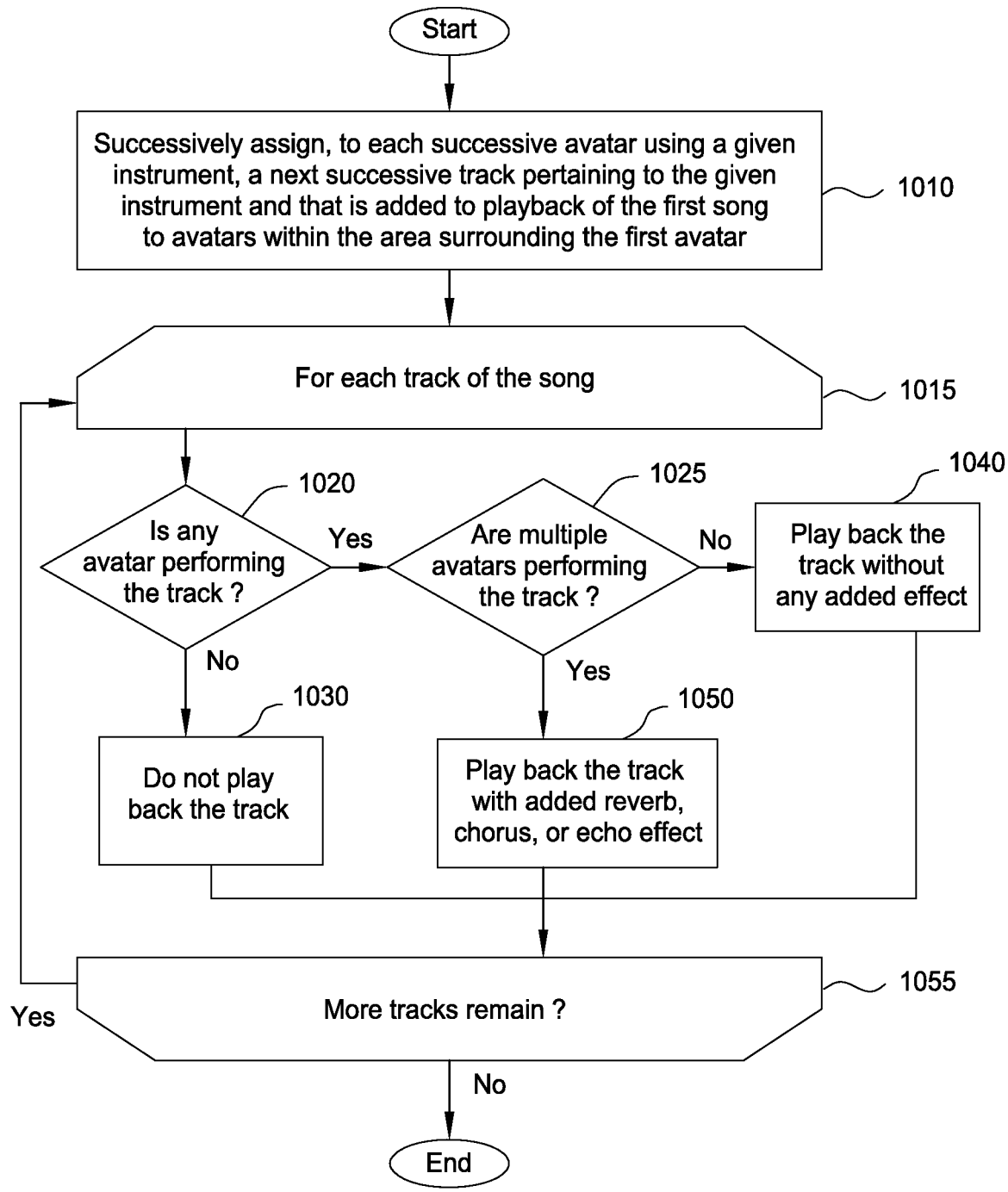
FIG. 10 is a flowchart depicting a method for adjusting playback of different tracks of the first song performed as part of the group activity in the virtual environment, according to one embodiment presented in this disclosure.

FIG. 10 is a flowchart depicting a method 1000 for adjusting playback of different tracks of the first song performed as part of the group activity in the virtual environment, according to one embodiment presented in this disclosure. As shown, the method 1000 begins at step 1010, where the virtual world application 102 successively assigns, to each successive avatar using a given instrument, a next successive track pertaining to the given instrument and that is added to playback of the first song to avatars within the area surrounding the first avatar.

At step 1015, the method 1000 enters a loop to process each track of the song. At step 1020, the virtual world application 102 determines whether the respective track is being performed by any avatar. If not, the virtual world application 102 does not play back the track (step 1030). Otherwise, the virtual world application 102 determines whether multiple avatars are currently performing the track (step 1025). If not, the virtual world application 102 plays back the track without any added effect (step 1040). Otherwise, the virtual world application 102 plays back the track with an added effect, e.g., a reverb effect, a chorus effect, an echo effect, etc. (step 1050). After the steps 1030, 1040 or 1050, the method 1000 proceeds to step 1055, where the virtual world application 102 determines whether any additional tracks remain to be processed. If so, the method 1000 returns to the step 1015 to process a next track. Otherwise, the method 1000 terminates.

Figure 11:
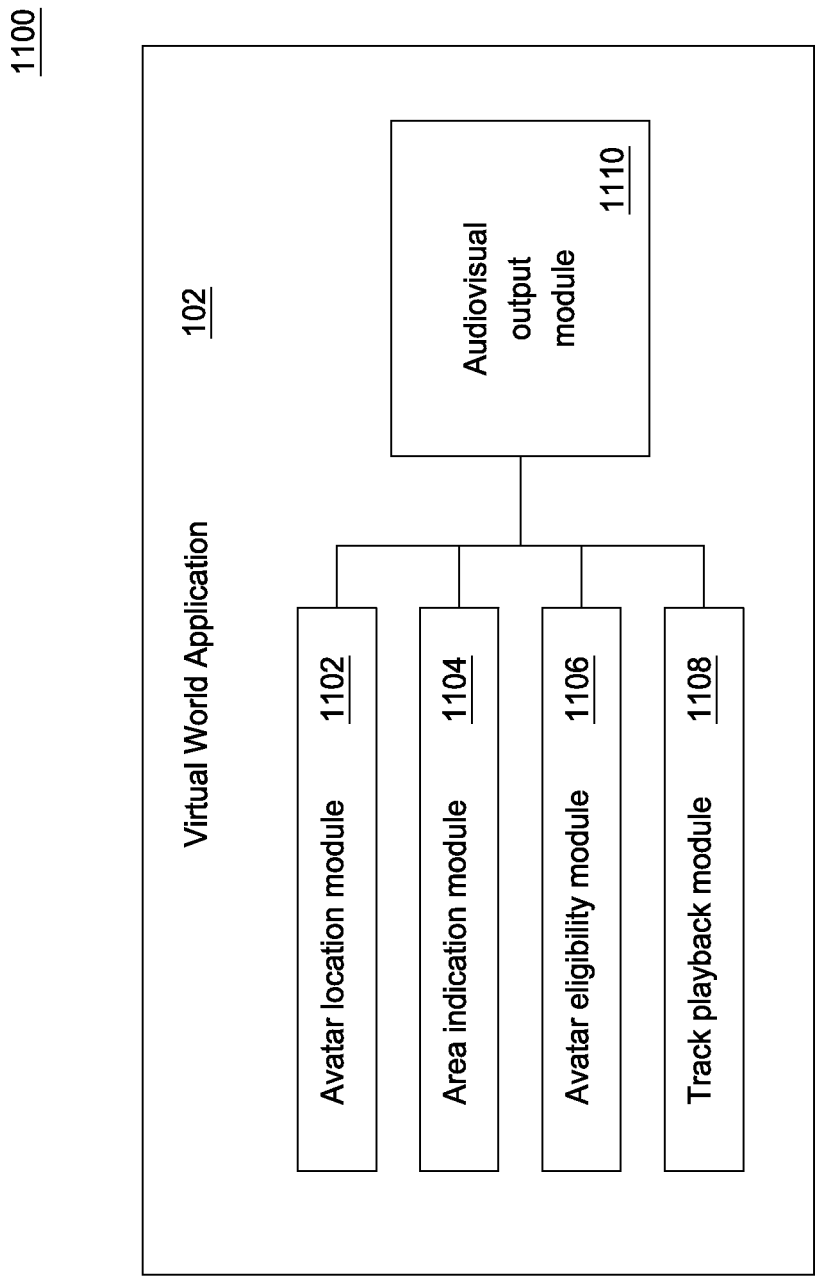
FIG. 11 is a block diagram illustrating components of a virtual world application to facilitate group activities in the virtual environment, according to one embodiment presented in this disclosure.

FIG. 11 is a block diagram illustrating components 1100 of the virtual world application 102 of FIG. 1, according to one embodiment presented in this disclosure. As shown, the components 1100 include an avatar location module 1102, an area indication module 1104, an avatar eligibility module 1106, a track playback module 1108, and an audiovisual output module 1110. Those skilled in the art will recognize that the components 1100 of the virtual world application 102 are merely exemplary, and other ways of implementing the virtual world application 102 are broadly contemplated in the present disclosure.

In one embodiment, the avatar location module 1102 is configured to determine locations of avatars based on one or more of a location of the avatars at an earlier point in time and user input controlling movement of the avatars. As least in some embodiments, the user input is used to determine that avatars have moved from a first location at the earlier point in time to a subsequent, different location. The area indication module 1104 is configured to determine areas of group activities based on locations of avatars leading the group activities, rules defining a desired size of the areas, and counts of current participants in the group activities. The avatar eligibility module 1106 is configured to determine which avatars are eligible to participate in which group activities, based on locations of the avatars, areas of the group activities, and properties of the group activities. The track playback module 1108 is configured to manage playback of instrument tracks of songs, based on counts of avatars assigned to perform the instrument tracks of the songs. The audiovisual output module 1110 is configured to output the avatars and the group activities in the virtual environment. The audiovisual output module 1110 is further configured to manage song volume levels and audio panning based on locations of the avatars and areas of the group activities. The audiovisual output module 1110 is also configured to convey areas of the group activities in the virtual environment.

Embodiments disclosed herein present techniques for facilitating group activities in a virtual environment. In one embodiment, a virtual world application is provided that conveys an indication of an area surrounding a first player leading a group activity in the virtual environment. The virtual world application disallows a second avatar from participating in the first group activity as long as the second avatar is outside of the area surrounding the first avatar in the virtual environment. On the other hand, the virtual world application allows the second avatar to participate in the first group activity so long as the second avatar is within the area surrounding the first avatar in the virtual environment. Accordingly, users may ascertain available group activities and participants and join or leave the available group activities more conveniently at least in some cases. Thus, user satisfaction with the virtual environment may be improved.

Figure 12:
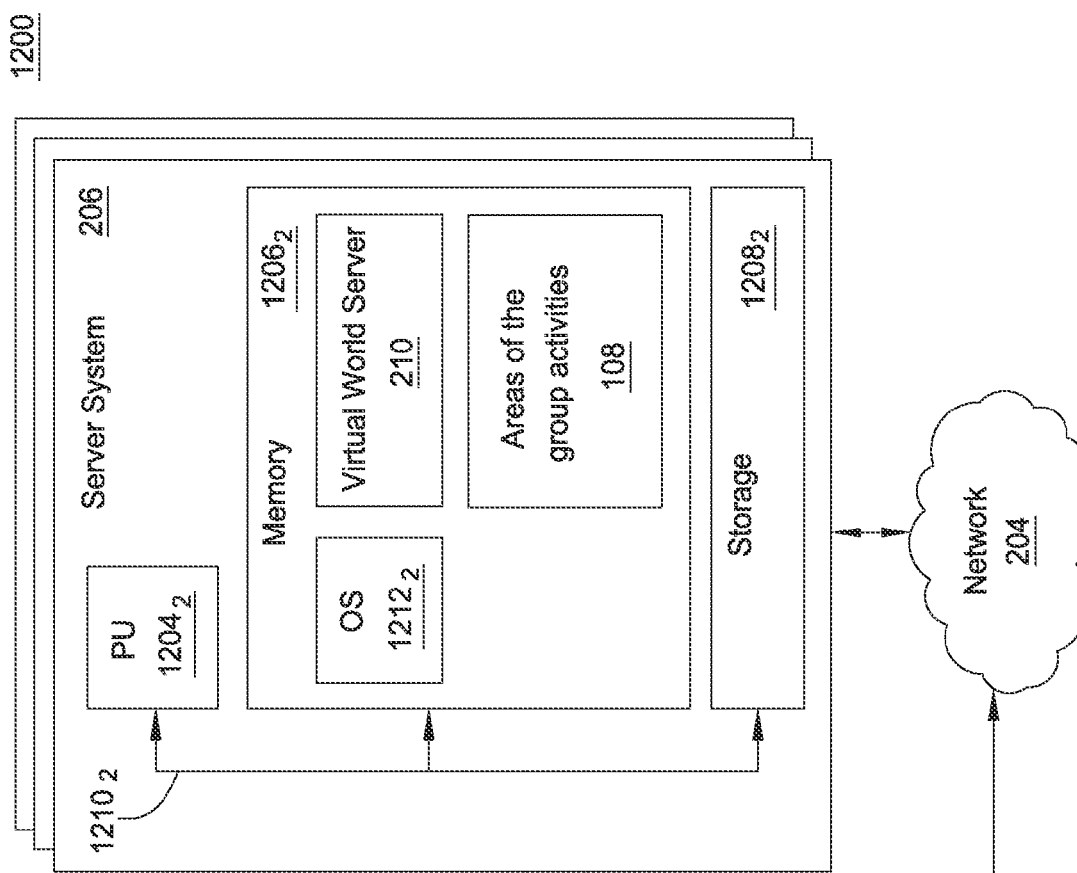
FIG. 12 is a block diagram illustrating a networked system configured to facilitate group activities in the virtual environment, according to one embodiment presented in this disclosure.
Figure 12:
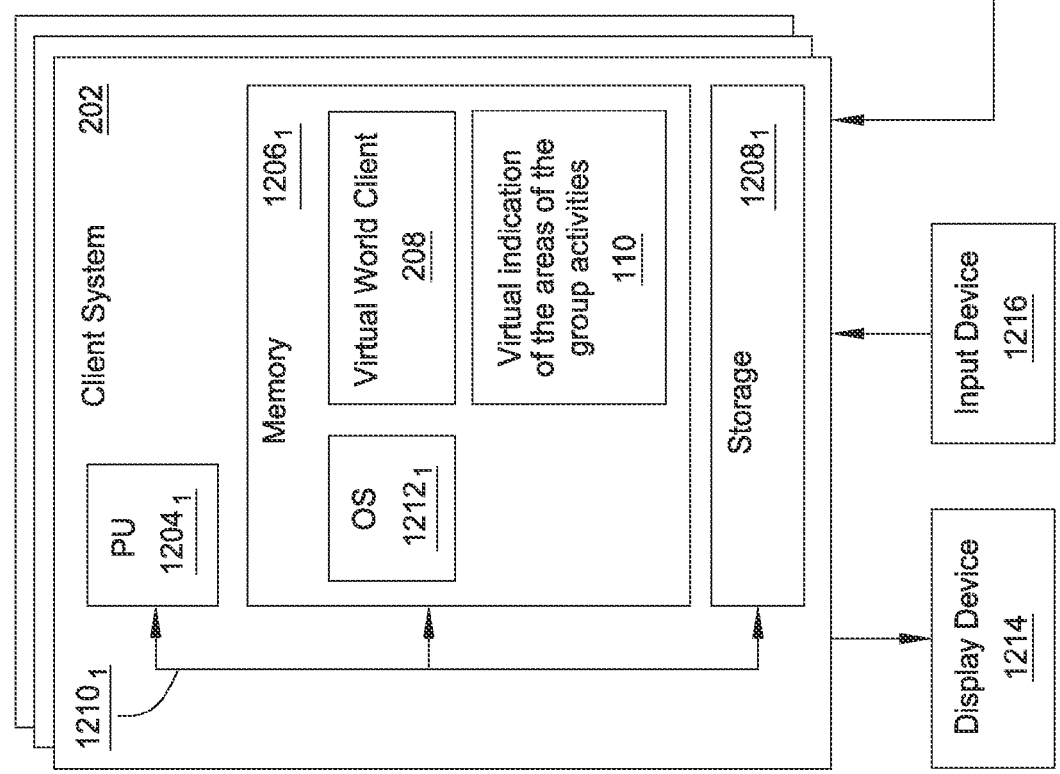

FIG. 12 is a block diagram illustrating a networked system 1200 configured to facilitate group activities in a virtual environment, according to one embodiment presented in this disclosure. The networked system 1200 corresponds to the networked system 200 of FIG. 2. As shown, the system 1200 includes a plurality of client systems 202 and a plurality of server systems 206, communicatively coupled via the network 204.

In one embodiment, the client systems 202 may include existing computer systems, e.g., desktop computers, server computers, laptop computers, tablet computers, gaming consoles, hand-held gaming devices and the like. The client systems 202 illustrated in FIG. 12, however, are merely examples of computer systems in which embodiments disclosed herein may be used. Embodiments disclosed herein may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments disclosed herein may be implemented using any device or computer system capable of performing the functions described herein.

As shown, each client system 202 and server system 206 includes, without limitation, a processor 1204, which obtains instructions and data via a bus 1210 from a memory 1106 and storage 1208. The processor 1204 is a programmable logic device that performs instruction, logic, and mathematical processing, and may be representative of one or more CPUs. The memory 1206 is any memory sufficiently large to hold the necessary programs and data structures. The memory 1206 could be one or a combination of memory devices, including Random Access Memory, nonvolatile or backup memory (e.g., programmable or Flash memories, read-only memories, etc.).

As shown, the memory 1206 includes an operating system ("OS") 1212. Operating system 1212 is software used for managing the operation of the client system 202 or the server system 206. Examples of the OS 1212 include UNIX, versions of the Microsoft Windows® operating system and distributions of the Linux® operating system. Additional examples of the OS 1212 include custom operating systems for gaming consoles, including the custom operating systems for systems such as the Microsoft Xbox 360®, Nintendo WHO and Sony PlayStation® 3. As shown, the memory $1206_1$ of the client system 202 further includes the virtual world client 208 and the virtual indications 110 of the areas of the group activities. The memory $1206_2$ of the server system 206 further includes the virtual world server 210 and the areas 108 of the group activities.

The storage 1208 is representative of hard-disk drives, flash memory devices, optical media and the like. Generally, the storage 1208 stores application programs and data for use by the client systems 202. In addition, the memory 1206 and the storage 1208 may be considered to include memory physically located elsewhere; for example, on another computer coupled to the client system 202 or to the server system 206 via the bus 1210. The client systems 202 and the server systems 206 are operably connected to the network 204, e.g., via network interfaces.

Additionally, the client systems 202 each are coupled to display devices 1214 and input devices 1216, respectively. The display devices 1214 may include output devices such as monitors, touch screen displays, and so on. For instance, the display devices 1214 may include a display device used to visually depict a virtual environment. As an example, the display 1214 may provide a touch sensitive surface allowing the user to select different locations within the virtual environment and control the movement of an avatar within the virtual environment. The input devices 1216 represent a wide variety of input devices, including keyboards, mice, controllers, and so on. Furthermore, the input devices 1216 may include a set of buttons, switches or other physical device mechanisms for controlling the client system 202. For example, the input devices 1216 could include a set of directional buttons used to navigate an avatar through a virtual environment presented on the display 1214.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the virtual world server 210) or related data available in the cloud. For example, the virtual world server 210 could execute on a computing system in the cloud and receive a request to commence a group activity, from a user (e.g., from the virtual world client 208 associated with the user). In such a case, the virtual world client 208 or the virtual world server 210 could determine an area pertaining to the group activity and generate a visual indication thereof, in order to improve the experience of the user and other users in the virtual environment.

The flowchart and block diagrams in the FIGS. illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method of facilitating group activities in a virtual environment, the computer-implemented method comprising:

upon detecting that a first avatar is leading a first group activity in the virtual environment, generating a group activity region based on a location of the first avatar, the group activity region comprising a first region surrounding the first avatar;

conveying an indication of the first region as being the group activity region;

conveying an indication of a second region surrounding a second avatar leading a second group activity in the virtual environment;

permitting a third avatar to participate in the first group activity with the first avatar in the first region, when the third avatar is within the first region surrounding the first avatar in the virtual environment and by operation of one or more computer processors, comprising, upon detecting the third avatar entering the first region, requesting a user of the third avatar to confirm whether the user desires to join the first group activity, wherein the third avatar is permitted to participate in the first group activity upon receiving, from the user of the third avatar, confirmation that the user desires to join the first group activity and provided that the third avatar remains within the first region; and prohibiting the third avatar from participating in the first group activity when the third avatar is outside of the first region;

wherein the first group activity includes performing a first song audible only within the first region.

2. The computer-implemented method of claim 1, wherein the conveyed indications are prohibited from overlapping in the virtual environment, wherein the computer-implemented method further comprises:

upon detecting that the second avatar is leading the second group activity in the virtual environment, generating a group activity region based on a location of the second avatar, the group activity region comprising the second region surrounding the second avatar;

prohibiting the third avatar from participating in the second group activity when the third avatar is outside of the second region; and permitting the third avatar to participate in the second group activity when the third avatar is within the second region.

3. The computer-implemented method of claim 2, wherein the second group activity includes performing a second song in the virtual environment, different from the first song, wherein each song includes a respective plurality of instruments, wherein the first region increases in size based on a total count of avatars participating in the first group activity;

wherein the first song is audible to the user of the third avatar only when the third avatar is within the first region, wherein the second song is audible to the user of the third avatar only when the third avatar is within the second region.

4. The computer-implemented method of claim 3, wherein the first song is output to the user of the third avatar via a plurality of audio channels comprising a left channel and a right channel, wherein when the third avatar is within the first region but is not participating in the first group activity, then the first song is output via each audio channel at a respective volume level that is based on a location and an orientation of the third avatar within the first region, such that the volume is increased based on a proximity of the third avatar to a predefined, central location within the first region, wherein the predefined, central location comprises a location of the first avatar;

wherein when the third avatar is within the first region and is participating in the first group activity, then the first song is output via each audio channel at a predefined maximum volume level pertaining to the predefined, central location within the first region, regardless of any location and regardless of any orientation of the third avatar within the first region, wherein a volume level of sound effects in the virtual environment is decreased when the first song is audible to the user of the third avatar, wherein ambient music is ceased to be output to the user when the first song is audible to the user, wherein the first song includes, for each instrument of the plurality of instruments, a plurality of distinct tracks pertaining to the respective instrument.

5. The computer-implemented method of claim 4, wherein the first region increases in size only up to a predefined maximum size, wherein the computer-implemented method further comprises, upon receiving, from the user of the third avatar, confirmation that the user desires to join the first group activity, requesting the user to select a desired instrument for use by the third avatar to participate in the first group activity;

wherein each successive avatar using a given instrument is assigned a next successive track pertaining to the given instrument and that is added to playback of the first song to avatars within the first region, wherein tracks not assigned to any avatar are not played back as part of the first song, wherein the first song is output by a virtual world application, wherein the virtual world application is configured to independently add each individual audio effect selected from a reverb effect, an echo effect, and a chorus effect to a given track of the first song, when multiple avatars are performing the given track of the first song and not when only a single avatar is performing the given track of the first song, wherein an intensity of the added effect is increased based on a count of the multiple avatars performing the given track of the first song and up to a predefined maximum intensity;

wherein a fourth avatar requesting to participate as a dancer in the first group activity is not assigned any track and does not result in any track being added to playback of the first song, wherein the computer-implemented method further comprises, upon receiving, from the user of the third avatar, a request to change to a different instrument, assigning the different instrument to the third avatar.

6. The computer-implemented method of claim 1, further comprising:

prohibiting the third avatar from participating in the second group activity when the third avatar is outside of the second region.

7. The computer-implemented method of claim 1, further comprising:

permitting the third avatar to participate in the second group activity when the third avatar is within the second region.

8. The computer-implemented method of claim 1, wherein the second group activity includes performing a second song in the virtual environment, different from the first song.

9. The computer-implemented method of claim 8, wherein the first song is audible to the user of the third avatar only when the third avatar is within the first region, wherein the second song is audible to the user of the third avatar only when the third avatar is within the second region.

10. The computer-implemented method of claim 8, wherein the first region increases in size based on a total count of avatars participating in the first group activity.

11. The computer-implemented method of claim 8, wherein each song includes a respective plurality of instruments, wherein each successive avatar using a respective instrument is assigned a next successive track pertaining to the respective instrument and that is added to playback of the first song to avatars within the first region, wherein tracks not assigned to any avatar are not played back as part of the first song.

12. A non-transitory computer-readable medium containing a program which, when executed, performs an operation to facilitate group activities in a virtual environment, the operation comprising:
   upon detecting that a first avatar is leading a first group activity in the virtual environment, generating a group activity region based on a location of the first avatar, the group activity region comprising a first region surrounding the first avatar;
      conveying an indication of the first region as being the group activity region;
      conveying an indication of a second region surrounding a second avatar leading a second group activity in the virtual environment;
   permitting a third avatar to participate in the first group activity with the first avatar in the first region, when the third avatar is within the first region and by operation of one or more computer processors when executing the program, comprising, upon detecting the third avatar entering the first region, requesting a user of the third avatar to confirm whether the user desires to join the first group activity, wherein the third avatar is permitted to participate in the first group activity upon receiving, from the user of the third avatar, confirmation that the user desires to join the first group activity and provided that the third avatar remains within the first region; and
   prohibiting the third avatar from participating in the first group activity when the third avatar is outside of the first region;
   wherein the first group activity includes performing a first song audible only within the first region.

13. The non-transitory computer-readable medium of claim 12, wherein the operation further comprises:
   prohibiting the third avatar from participating in the second group activity when the third avatar is outside of the second region.

14. The non-transitory computer-readable medium of claim 12, wherein the operation further comprises:
   permitting the third avatar to participate in the second group activity when the third avatar is within the second region.

15. The non-transitory computer-readable medium of claim 12, wherein the second group activity includes performing a second song in the virtual environment, different from the first song.

16. The non-transitory computer-readable medium of claim 15, wherein the first song is audible to the user of the third avatar only when the third avatar is within the first region, wherein the second song is audible to the user of the third avatar only when the third avatar is within the second region.

17. The non-transitory computer-readable medium of claim 15, wherein the first region increases in size based on a total count of avatars participating in the first group activity.

18. A system to facilitate group activities in a virtual environment, the system comprising:
   one or more computer processors;
   a memory containing a program which, when executed by the one or more computer processors, is configured to perform an operation comprising:
      upon detecting that a first avatar is leading a first group activity in the virtual environment, generating a group activity region based on a location of the first avatar, the group activity region comprising a first region surrounding the first avatar;
      conveying an indication of the first region as being the group activity region;
      conveying an indication of a second region surrounding a second avatar leading a second group activity in the virtual environment;
      permitting a third avatar to participate in the first group activity with the first avatar in the first region, when the third avatar is within the first region, comprising, upon detecting the third avatar entering the first region, requesting a user of the third avatar to confirm whether the user desires to join the first group activity, wherein the third avatar is permitted to participate in the first group activity upon receiving, from the user of the third avatar, confirmation that the user desires to join the first group activity and provided that the third avatar remains within the first region; and
      prohibiting the third avatar from participating in the first group activity when the third avatar is outside of the first region;
      wherein the first group activity includes performing a first song audible only within the first region.

19. The system of claim 18, wherein the operation further comprises:
   prohibiting the third avatar from participating in the second group activity when the third avatar is outside of the second region.

20. The system of claim 18, wherein the operation further comprises:
   permitting the third avatar to participate in the second group activity when the third avatar is within the second region.

21. The system of claim 18, wherein the second group activity includes performing a second song in the virtual environment, different from the first song.

22. The system of claim 21, wherein the first song is audible to the user of the third avatar only when the third avatar is within the first region, wherein the second song is audible to the user of the third avatar only when the third avatar is within the second region.

23. The system of claim 21, wherein the first region increases in size based on a total count of avatars participating in the first group activity.

* * * * *

UNITED STATES PATENT AND TRADEMARK OFFICE
CERTIFICATE OF CORRECTION

| | | |
|---|---|---|
| PATENT NO. | : 9,244,588 B2 | Page 1 of 1 |
| APPLICATION NO. | : 13/843701 | |
| DATED | : January 26, 2016 | |
| INVENTOR(S) | : Begosa et al. | |

It is certified that error appears in the above-identified patent and that said Letters Patent is hereby corrected as shown below:

Specification

In the Detailed Description:

Column 9, Line 62, please delete "WHO" and insert --Wii®-- therefor.

Signed and Sealed this
Twenty-sixth Day of April, 2016

Michelle K. Lee
*Director of the United States Patent and Trademark Office*